Patented Aug. 23, 1927.

1,639,982

UNITED STATES PATENT OFFICE

OLIVER W. STOREY, OF MADISON, WISCONSIN, ASSIGNOR TO C. F. BURGESS LABORATORIES, INC., OF DOVER, DELAWARE, A CORPORATION OF DELAWARE.

PRODUCING SOLID OXIDES OF CARBON.

No Drawing.     Application filed July 7, 1925. Serial No. 42,028.

This invention relates to the art of producing solid oxides of carbon having the properties of graphitic oxide. More in detail the invention comprises a method of utilizing oxygen, as from the air, for the production of solid oxides of carbon, nitric acid being used as the oxygen carrier.

According to my invention initial oxidation of carbonaceous material may be effected by chemical methods, or by electrochemical methods, with consequent reduction of the nitric acid to lower oxides of nitrogen, either gaseous or in solution, this being followed by regeneration to nitric acid by a procedure whereby the lower oxides are brought into intimate contact with oxygen, as of the air, and thus are regenerated for further use in the oxidation of carbonaceous material to form solid oxides of carbon. The complete nitric acid cycle of reduction, reoxidation and reuse is reliable and economical, and is an important factor in placing on a commercial basis the broader art of producing from graphite, calcined petroleum coke, and the like, solid oxides of carbon having the properties of graphitic oxide, and having properties which render them commercially valuable.

The solid oxide of carbon generally known as graphitic oxide, or graphitic acid, was first prepared by Brodie in 1859. He used a mixture of potassium chlorate and fuming nitric acid, with which he treated Ceylon or similar graphite. He obtained a yellow or straw colored solid end product which since has been shown to be a colloidal compound of carbon and oxygen. Because of its colloidal character, water is always associated with it. It is not known whether this is a mixture of oxides or a single definite oxide.

This yellow oxide has the peculiar property of deflagrating when heated to a low temperature and may be recognized by this simple test. It has been discovered by another that this solid oxide of carbon will oxidize an acidified ferrous sulphate solution such as is used for the determination of the available oxygen in pyrolusite.

While the Brodie method of preparing graphitic oxide is the one generally used, other chemical methods have been devised. All such methods are dependent upon strongly oxidizing mixtures usually containing one or more concentrated acids and an oxidizing salt. These mixtures often are explosive and therefore dangerous to handle. In addition, the yields are low and the cost high, so that graphitic oxide has been more or less of a laboratory curiosity.

The only use known to me to which graphitic oxide has been put in the past has been in the testing of carbon compounds to determine the presence of graphite. Even this procedure has been the subject of much controversy. Some experts maintain that graphite alone will produce graphitic oxide, while others maintain that other forms of carbon will produce this same yellow oxide. It is possible to produce a deflagrating oxide which oxidizes ferrous sulphate, from forms of carbon other than the unctuous, highly crystalline products known as Ceylon or as Acheson graphite. Much uncertainty exists about the relation between the solid oxide or oxides of carbon and carbon in its various modifications.

While the yellow graphitic oxide is the end product generally desired, this end product requires the repetition of the oxidation a number of times. Since the oxidation proceeds from the exterior of the carbonaceous particle to the interior, the first oxidation is the most effective, as is shown by the oxygen determinations. The second and subsequent oxidizing liquids have to penetrate the colloidal enveloping oxide shell before they can oxidize the core of unchanged carbonaceous material. A particle of carbon, whether it is unctuous crystalline graphite or highly calcined petroleum coke, after being given a first oxidation, may show but little change in color from the original material. A highly crystalline graphite may show a greenish tinge while a highly calcined coke may not show any definite change. Under the microscope, the surface shows a matte effect. Such a product, although almost black or dead black in color, may have as high as 10 percent of combined oxygen due to the formation of a solid oxide or oxides of carbon. It has the property of deflagrating when heated and oxidizes acidified ferrous sulphate. It is, in effect, a shell of graphitic oxide or oxides with a core of unchanged carbon.

My associate, Bruce K. Brown, has devised a method for the preparation of a solid oxide or oxides having the properties of graphitic oxide by subjecting carbonaceous materials to electrochemical oxidation. This method consists in mounting the carbonaceous material as anode in an oxidizing electrolyte, such as 30% nitric acid at about room temperature and passing an electric current having a density of about ten amperes per square foot of anode surface. The anode disintegrates to a sludge which is a mixture of carbon and oxide of carbon and may contain as high as 6% by weight of available oxygen. Carbon so oxidized does not have the yellow color of pure graphitic oxide but has the dull black appearance of partially oxidized carbon and it apparently is identical or approximately identical with the product obtained by chemical oxidation. This material may be employed in place of manganese dioxide as a depolarizer in dry cells.

Nitric acid is especially effective in oxidizing carbonaceous materials to solid oxides of carbon, either when used by the ordinary chemical methods, or by the novel electrochemical method devised by Brown.

When the carbon is oxidized by the usual chemical methods, the nitric acid should be used in as concentrated a form as possible, for water slows down the reaction. In the electrochemical method, the electrolyte preferably contains dilute nitric acid. In the chemical method, concentrated nitric acid alone is ineffective as an oxidizing agent, the quantity of solid oxide which is formed being relatively small. In the Brodie method, potassium chlorate is added to the concentrated nitric acid. In the Staudenmaier method, concentrated sulphuric acid and potassium chlorate are used, in conjunction with the concentrated nitric acid. No doubt other oxidizing salts may be added to secure the desired oxidation. Concentrated sulphuric and nitric acids alone will oxidize carbonaceous materials to solid oxides of carbon. In the electrochemical method, dilute nitric acid alone is an effective electrolyte. Many other salts may be added to the dilute nitric acid to increase the efficiency of the electrolyte, such as chlorates, fluorides, chlorides, etc. A mixture of sulphuric acid and nitrates such as the alkali nitrates may be used as a substitute for nitric acid.

The reaction which results in the oxidation of the carbonaceous materials also reduces the nitric acid to the lower oxides of nitrogen. It is to this aspect of the procedure that my present invention is particularly directed. I have not determined which of the lower oxides of nitrogen are formed. Their composition will depend upon many factors. In the electrochemical oxidation with dilute nitric acid, I have been able to continue the oxidation to a point where the electrolyte becomes alkaline, due to the formation of ammonia. If the nitric acid electrolyte is of a certain concentration, it will turn a bluish green when the oxidation has proceeded for a sufficient time, indicating that a quantity of nitric oxide (NO) has been formed and is in solution in the nitric acid. The same phenomenon is noted if an electrolyte of sulphuric acid and sodium nitrate is used. If sodium bichromate is added to the nitric acid electrolyte the solution gradually turns to a green color with certain concentrations. Under these conditions the bichromate no doubt oxidizes the lower oxides of nitrogen to form nitric acid, with the formation of the green chromium salts. This is apparently confirmed by the absence of any oxide of nitrogen fumes above the electrolyte, such as are present when nitric acid alone is used.

The reduction of the nitric acid to the lower oxides of nitrogen finally stops the oxidation entirely. The oxidizing solution must be discarded entirely unless some method is available for the regeneration of the constituents. I have found such a method.

I have discovered that the lower oxides of nitrogen, whether in gaseous form or in solution, formed in the oxidation of carbonaceous material to solid oxides of carbon, may be readily reoxidized by oxygen in the presence of water and may then be used again. Either pure oxygen or air may be used to carry out this reaction. The oxides of nitrogen which are evolved from the surface of the liquids may also be recovered in a similar manner.

This method of recovery is especially adapted to those solutions and electrolytes which contain nitric acid alone and those which are mixtures of nitric acid and such salts and acids as do not interfere with the recovery, for instance, nitric acid and sulphuric acid, nitric acid and chromium salts, nitric acid and chlorates, nitric acid and chlorides.

It is possible to blow air through a nitric acid electrolyte during electrolysis and keep the amount of lower oxides of nitrogen down to a minimum. A solution containing lower oxides standing in contact with air will gradually oxidize. However, these methods have the disadvantage that the oxides of nitrogen are slowly evolved from the surface and are lost in the atmosphere. I have found that an effective method is to pass the reduced solution together with evolved gases through a nitric acid spray tower so that it comes in intimate contact with air or oxygen. The tower may be constructed in the usual manner for such operations—well known to those skilled in the art of handling nitric acid. Passing the air or oxygen through the tower in the same direction as the liquid flow will cut the gas losses to a minimum. A counter-current scheme of oxidation and absorption may be used provided some means are provided for the recovery of nitrogen oxides from the tail gases.

This method of recovering and oxidizing the waste nitrogen oxide gases and solutions containing these gases therefore affords a method of utilizing atmospheric oxygen for the production of solid oxides of carbon, the nitric acid being the oxygen carrier. The economic importance of this method will be apparent to those skilled in the art.

Throughout the specifications and claims carbon and carbonaceous material is used in the broader sense and includes the graphitic state of the element.

I claim:

1. The method which comprises submitting a carbon anode to an electric current in a bath containing nitric acid to form solid oxide of carbon and oxidizing the resulting oxides of nitrogen.

2. The method which comprises submitting an anode formed essentially of carbon to an electric current in a bath containing nitric acid to form solid oxide of carbon and oxidizing the resulting oxides of nitrogen.

3. The method which comprises submitting an anode formed essentially of carbon to an electric current in a bath containing nitric acid to form solid oxide of carbon and circulating the resulting oxides of nitrogen in contact with oxygen to effect reoxidation thereof for reuse.

4. The method which comprises submitting an anode formed essentially of carbon to an electric current in a bath containing nitric acid to form solid oxide of carbon and circulating the solution containing the oxides of nitrogen in intimate contact with oxygen to regenerate said solution for reuse.

5. The method which comprises submitting an anode formed essentially of carbon to an electric current in a bath containing nitric acid to form solid oxide of carbon and bringing the solution containing the oxides of nitrogen into intimate contact with air to regenerate said solution for reuse.

6. The method which comprises submitting an anode of graphitic material to an electric current in a bath containing nitric acid to form solid oxide of carbon to form oxides of carbon and bringing the solution containing the resulting oxides of nitrogen into intimate contact with air to regenerate said solution.

7. The method which comprises submitting an anode formed essentially of carbon to an electric current in a bath containing nitric acid to form solid oxide of carbon, circulating the solution containing the oxides of nitrogen, and also the gaseous oxides from the solution, into intimate contact with air to regenerate said solution for reuse.

In testimony whereof I affix my signature.

OLIVER W. STOREY.